United States Patent [19]
Bonin

[11] Patent Number: 5,562,870
[45] Date of Patent: Oct. 8, 1996

[54] METHOD OF PRODUCING HOLLOW, HEAT-RESISTANT BEADS

[75] Inventor: Wulf V. Bonin, Odenthal, Germany

[73] Assignee: Bayer Aktiengesellschaft, Leverkusen, Germany

[21] Appl. No.: 352,644

[22] Filed: Dec. 9, 1994

[30] Foreign Application Priority Data

Dec. 17, 1993 [DE] Germany ............... 43 43 196.8

[51] Int. Cl.$^6$ ............... B29B 9/00; B29C 65/00
[52] U.S. Cl. ............... 264/8; 264/13; 264/414; 264/430; 264/432; 264/42; 264/140
[58] Field of Search ............... 264/5, 8, 9, 12, 264/13, 14, 25, 26, 43, 44, 140, 414, 430, 432

[56] References Cited

U.S. PATENT DOCUMENTS

| | | | |
|---|---|---|---|
| 4,364,855 | 12/1982 | McDaniel et al. | 252/437 |
| 4,444,965 | 4/1984 | McDaniel et al. | 526/105 |
| 5,324,697 | 6/1994 | Mueller et al. | 502/112 |

*Primary Examiner*—Christopher A. Fiorilla
*Attorney, Agent, or Firm*—Sprung Horn Kramer & Woods

[57] ABSTRACT

Novel hollow beads are characterized in that they contain aluminium phosphates optionally containing boron. They can be produced by first drying, at from 20° to 200° C., reaction products of acid aluminium phosphates (and optionally boric acid) with amines, then comminuting them and finally subjecting them to a heat shock of from 200° to 1200° C. Such hollow beads can be used for a great variety of purposes.

8 Claims, No Drawings

METHOD OF PRODUCING HOLLOW, HEAT-RESISTANT BEADS

The present invention relates to hollow beads made of aluminium phosphates, which optionally also contain boron, a process for their production and their use for a great variety of purposes.

BACKGROUND OF THE INVENTION

Hollow beads are already known. Those made of organic material generally have the disadvantage of being destroyed at temperatures above 300° C. Glass hollow beads generally melt at temperatures around 600° C. and siliceous fly-ash hollow beads are thermally stable to above 1000° C. However, glass and fly-ash hollow beads generally have a bulk density which is not easily controlled and is too high at over 100 gl and frequently have a chemical composition which is difficult to control.

Hollow beads have now been found which are characterized in that they contain aluminium phosphates or aluminium boron phosphates.

Hollow beads of the invention have, depending on any decomposition and/or oxidation processes of accompanying materials during production, a colour which varies between colourless, pale yellow via brownish to, as a result of inclusions of carbon of pyrolysis, blackish brown or, in the case of oxidation of the carbon caused by admission of air, also porcelain-like white.

The hollow beads are not siliceous, have good controllability of the chemical composition and the particle size and have a high heat resistance up to over 1200° C.

Hollow beads of the invention can be produced by first drying, at from 20° to 200° C., reaction products of acid aluminium phosphates (and optionally boric acids) with amines, then comminuting them and finally subjecting them to a heat shock of from 200° to 1200° C. The reaction products of acid aluminium phosphates (and optionally boric acids) and mines can also be ones with amine salts.

DESCRIPTION OF THE PREFERRED EMBODIMENTS

The preferred starting materials used are reaction products of acid aluminium phosphates with alkanolamines, particularly preferably with monoethanolamine, or are reaction products of acid aluminiumphosphates with amine salts, for example amine salts of boric acid and in particular with monoethanolamine salts of boric acid.

The comminution to be carried out after drying can be achieved, for example, by milling, pulverizing and crushing. If desired, it is also possible to carry out granulation. After comminution, the reaction products of aluminium phosphate (and optionally boric acids) with amines can optionally be fractionated, i.e. sorted according to particle size.

The heat shock can, for example, be applied by subjecting the dried and comminuted reaction products of aluminium phosphates (and optionally boric acids) with amine salts to rapid heating in a solid, pulverulent, liquid or gaseous heat transfer medium (which optionally acts as separating agent), or by the direct action of microwaves, alternating fields or radiation. In this process, the particles inflate to form hollow beads having bulk densities between, for example, 10 and 500 g/l, going through a thermoplastic stage.

By this means, the original aluminium phosphate-amine complex, optionally also containing boron and water, is more or less destroyed and hollow beads of aluminium phosphates or aluminium boron phosphates are formed, in particular at temperatures above 600° C.

The preparation of the reaction products of acid aluminium phosphates (and optionally boric acids) with amines can be carried out in aqueous medium, for example by combining a solution of an acid aluminium phosphate with a solution of an amine, amine salt or amine salt of boric acid at temperatures between 20° and 120° C., preferably between 50° and 95° C., and subsequent drying. The drying can be carried out, for example, by drum or spray drying.

Suitable heat transfer medium for the heat shock are pulverulent media such as silicas, sand talc, graphite, aluminium oxides or magnesium oxide. The aluminium phosphate-amine reaction products can be embedded in such pulverulent media or be dusted or coated therewith. The reaction products can also be heated to the inflation temperature in a fluidized bed or dusted or undusted particles can be conveyed on a support material, e.g. a steel belt, through a heated furnace or an irradiation field. The particles of the reaction products can also, in combination with a spray drying process or in dried form, be conveyed through a hot air stream, a fuel gas stream, a flame or a microwave field. Inflation in a hot liquid, e.g. in a silicone oil bath, is also possible. The particles of the reaction products can also be fed with the inflow air to a gas or oil burner and allowed to inflate in the flame. In such a process, combustible cleavage products formed are immediately burnt, which is ecologically advantageous.

The extremely simple formation of such spherical, hollow beads, even having diameters of above 3 mm, from starting material which has been dried at, for example, from 30° to 180° C. and has been comminuted in any way, at for example from 250° C. to 600° C., could not have been foreseen and is surprising.

Particular embodiments of the present invention are:

Hollow beads, consisting predominantly of aluminium phosphates, in particular aluminium boron phosphates, which have a bulk density of up to 500, in particular from 10 to 90, gl.

Hollow beads, produced by heating of solid particles of complex amine salts of acid phosphates of aluminium, which optionally contain boron.

Hollow beads, produced by heating of solid particles of reaction products of acid aluminium phosphates with alkanolamine salts of boric acid.

Hollow beads, produced by means of a heat shock of from 200° to 1200° C. acting on particles of the amine phosphate salts which have been predried at up to 200° C.

Hollow beads, produced by means of a heat shock of from 250° to 1000° C. acting on particles of the amine salts of acid phosphates of aluminium.

Hollow beads, produced by drying, at from 90° to 200° C., of reaction products of acid aluminiumphosphates with ethanolamine salts of boric acid and/or ammonium salts of boric acid and action of a heat shock of from 250° to 1000° C.

Hollow beads, produced from reaction products of acid aluminiumphosphates with alkanolamine salts of boric acid, which contain at least 1.5 atoms of phosphorus per aluminium atom, at least 1 base equivalent of alkanolamine per boron atom and at least 0.5 base equivalents of alkanolamine per phosphorus atom.

Hollow beads, produced from a reaction product which has been obtained by the reaction of one mol of aluminium hydroxide and from 2 to 3 tool of o-phosphoric acid in the presence of water, admixing the solution formed with from 2 to 6 base equivalents of amine and/or with the salt of 1 mol of o-boric acid and from 1 to 6 base equivalents of amine at temperatures of from 20° to 120° C., drying the solution of the reaction products at from 90° to 200° C., comminution of the reaction products to an average particle size of from 0.01 to 1 cm, preferably from 0.05 to 0.5 cm and action of a heat shock of from 250 to 1000° C. on the reaction product dried at from 20° to 200° C.

Hollow beads, produced by action of a heat shock of from 250° to 1200° C., where the particles to be inflated contain from 0 to 5 boron atoms per aluminium atom and at least i base equivalent of amine per phosphorus atom and at least one further base equivalent of amine per boron atom.

Hollow beads, produced from reaction products of acid aluminium phosphates with amines, in which at least 50 equivalent-% of the amine are monoethanolamine.

Hollow beads, produced from phosphate salts, containing 1 atom of aluminium per phosphorus atom and optionally boron per 1 atom of phosphorus.

Hollow beads, produced from reaction products which contain monoethanolamine and optionally ammonia as amine component.

The use of hollow beads of the invention for (preventive) fire protection, as insulating material, as packing material, for covering liquids, as additive to surface finishes, coatings, mortars, concrete and gypsum plaster, as fillers for liquid and solid synthetic resins, elastomers and plastics, for producing platelet-shaped pigments, as electrical insulating material, as additive to knifing fillers, ceramic slips, brick bodies, flooring, putties, ceramic, glass compositions and metallic and nonmetallic sintering compositions, as starting materials for the production of light-weight shaped parts and as part of components for building and construction having insulating and sound-absorbing properties.

Hollow beads of the invention additionally containing fillers.

Shaped bodies containing hollow beads of the invention and expandable or completely or partially expanded graphite.

The preparation of the acid aluminiumphosphates is preferably carried out in from 60 to 85% strength, in particular from 65 to 80% strength, aqueous solution. The starting material used is preferably aluminium oxide, but it is also possible to Use elemental aluminium and other aluminium compounds capable of forming phosphates, such as oxides, hydrated oxides, acetates and other salts of volatile acids or alkoxides.

The phosphoric acid used for forming the acid aluminium phosphates is preferably o-phosphoric acid. However, it is also possible to use other phosphorus compounds suitable for forming phosphates in aqueous medium, such as phosphorus oxides and their hydration products, dehydration products of o-phosphoric acid, phosphorus acids of lower oxidation states, esters and decomposable salts, such as amine salts of phosphoric acids.

The boric acid used is preferably $H_3BO_3$. However, it is also possible to use dehydrated boric acid, boron oxides and their hydration products, and also esters or salts of the boric acids with volatile components.

The amines used are preferably alkanolamine, preferably monoethanolamine and ammonia. It is also possible to use other amines, e.g. polyalkylene polyamines, but in particular water-soluble alkanolamines, e.g. addition products of ethylene oxide and/or propylene oxide to ammonia or to other amines, in particular to aliphatic amines, thus, for example, addition products of 1 and more mols of epoxide to ammonia, to methylamine, dimethylamine, ethylamine, morpholine, ethylenediamine and polyethylenepolyamines.

The amine phosphate salts to be used for the production of the hollow beads of the invention can be obtained by reaction of the acid aluminiumphosphates with rhea mines or with the amine salts of boric acid optionally also present in aqueous medium. The reaction is preferably carried out by addition of the aluminium phosphate solution to the, optionally aqueous, amine solution or to the amine salt of boric acid with thorough mixing at from 20° to 120° C., preferably at from 50° to 95° C.

The phosphate-amine salt reaction products obtainable in this way are then present, for example, in from 40 to 96% strength by weight, preferably from 60 to 96% strength by weight, predominantly aqueous solution.

The preparation of reaction products of acid aluminium phosphates with amines can also be carried out in ways other than those described above, for example by means of combining the specified base components in a different order or by variation thereof in respect of concentration and mixing.

The production of hollow beads of the invention is carried out by the action of a heat shock on the amine phosphate salts present in particle form and more or less dried, e.g. either during the drying process or directly thereafter, for example in a spray drying process by increasing the temperature or by injecting the amine phosphate salt solution into a flame or into a fluidized bed having corresponding temperatures. A technically simple process is one in which the amine phosphate salt is first dried at temperatures below 250° C. and any desired pressures, preferably at atmospheric pressure and from 90° to 200° C., then comminuted and then subjected to the heat shock at above 200° C., preferably at from 250° to 1000° C., in particular from 300° to 650° C. It is particularly advantageous if the heating of the phosphate particles is as rapid as possible, e.g. by introducing them into a preheated furnace or by allowing them to fall through a vertical tube heated to from 500° to 1200° C. or feeding them into a fuel gas stream heated to from 300° to 1200° C.

The expansion process can also be carried out in a plurality of stages, for example first for a short time (e.g. from 0.1 to 6 minutes) at temperatures in the range from 250° to 300° C. and then subsequently at higher temperatures, e.g. in the range from 300° to 600° C.

If colourless hollow beads are to be obtained, it is advantageous to expose them to an oxidizing atmosphere directly or subsequently at temperatures in the range from 600° to 1500° C.

The particle size of the hollow beads of the invention can be controlled for a given phosphate salt, for example, by the degree of drying thereof and the particle size thereof. For example, phosphate particles having average diameters of from 0.01 to 1 cm can be used. Starting particle sizes in the range from 0.5 to 5 mm for the average external diameter are particularly well suited. Phosphate particles having an average diameter below 0.1 mm are particularly suitable if the heat shock is to be carried out in a flame or in an intensive IR radiation field.

Hollow beads of the invention can be produced from more or less tightly classified particle fractions of the phosphates or from phosphates having a broad particle size distribution.

The size and the bulk density of the hollow beads which can be obtained depend, at otherwise set production conditions, primarily on the particle size of the phosphate salts. The hollow beads usually have an average diameter from 5 to 50 times greater than that of the phosphate used.

The bulk densities of the hollow beads of the invention can be, for example, from 10 to 500 g/l. However, it is unproblematical to achieve higher bulk densities, e.g. up to 700 g/l and even higher, by, for example, lowering the temperature of the heat shock. For a given starting material, higher bulk densities can also be achieved by slower heating.

The hollow beads of the invention are insoluble in water if they have been produced at temperatures above 300° C. or produced at temperatures above 250° C. and have been heat treated for more than 30 minutes. This is particularly true of hollow beads made of phosphate salts in which one aluminium atom is present per atom of phosphorus and, if they contain boron, one phosphorus atom is also present per boron atom.

In general, the hollow beads consist of a hollow space enclosed by the shell. However, it has also been observed that, in particular in the case of bead diameters above about 4 mm, foam-like structures can occur inside too.

The hollow beads of the invention can be used for the purposes described above. The hollow beads can also be bound, for instance by means of sintering or by means of organic or inorganic binders, e.g. clay slip, glass slip, silica sols (also in solution), alkali metal silicates, starting materials for production of the hollow beads, other phosphates, cements, aqueous and non-aqueous preparations of synthetic resins (e.g. based on formaldehyde resins, isocyanates or polyurethane formulations), epoxy resins, UP resins, plastic or polymer latices and powders, the latter in particular having thermoplastic properties, to form tabular articles or other shaped parts. Such shaped parts can optionally also contain mineral or organic reinforcers (e.g. made of kaolin, glass, carbon, polyamides, polyesters and polyolefins in powder, fibre or film form).

It is also possible to mix fillers into the solutions of the phosphate salts prior to or after drying, e.g. by dusting or coating, e.g. in amounts of up to 80% by weight, preferably up to 50% by weight, in particular up to 20% by weight.

In a similar way, it is possible, e.g. in fluidized-bed granulation, to coat given solid or filler particles with the phosphate particles to be used in the hollow bead production of the invention and to use the particles then obtained for hollow bead production.

Of particular interest is the possibility of adding expandable silicates or expandable graphite, e.g. commercial $SO_x$ or $NO_x$ expandable graphite, for example in amounts of from 0.5 to 30, preferably from 3 to 20, % by weight to the solutions of the phosphate salts to be used prior to drying. In hollow bead production, such preparations give particles whose hollow spaces are filled with expanded graphite and whose surfaces are coated with expanded graphite. Such particles hardly tend to cake, an effect which can also be achieved by coating the surfaces of unfilled phosphate salt particles with expandable graphite.

Graphite-containing hollow particles obtainable in this way can in turn be processed to give shaped parts. They can be used as more or less electrically conductive, thermally insulating or else, in the case of high graphite contents, relatively heat conductive components, for example for sound absorption or electrical or electromagnetic shielding at high temperatures.

Crushing of the hollow beads of the invention gives a mica-like, platelet-shaped material which is suitable for producing paper-like sheet structures for electrical insulation purposes at high temperatures and as mica-like pigment for surface finishes and coatings.

The invention is illustrated below by way of example, with parts specified being by weight and percentages specified being by weight, unless otherwise indicated.

EXAMPLES

Preparation of Starting Materials

Phosphate Salt 1

A phosphate salt was prepared which contained, regarded mathematically, 3 boron atoms, 6 phosphate groups and 6 base equivalents of amine per 3 aluminium atoms. For this purpose, 693 parts of 85% strength o-phosphoric acid and 350 parts of water were first reacted with 234 parts of aluminium hydroxide at 95° C. As soon as a clear solution had been formed, it was cooled with further stirring. Separately therefrom, 186 parts of o-boric acid were reacted with 50 parts of water and 367 parts of monoethanolamine at 70° C. This gave a clear solution. The boron/amine salt solution was then initially charged at 75° C. and the aluminium phosphate solution was metered in over the course of 30 minutes with intensive mixing. The mixture was stirred for a further 2 hours at 95° C. and this then gave a clear solution which had a pH of, 7 and was dried in a circulated-air oven at 120° C.

Phosphate Salt 2

A phosphate salt was prepared which contained, regarded mathematically, 9.5 boron atoms, 6 phosphate groups and 9.5 base equivalents of amine per 2 aluminium atoms. For this purpose, 1385 parts of 85% strength o-phosphoric acid and 312 parts of aluminium hydroxide in the form of hydrargillite were first stirred together for 2 hours at 100° C. This gave a virtually clear, viscous solution. Separately therefrom, 611 parts of monoethanolamine were stirred with 618 parts of o-boric acid at 90° C. until a clear solution was formed. 65.7 parts of the amine salt solution were then intensively stirred with 34.3 parts of the aluminium phosphate solution at 100° C. Further stirring at 90° C. for 2 hours gave a virtually clear solution having a calculated solids content of 95%. The pH of this solution was 7. The solution was dried in a circulated-air oven at 90° C. This gave a brittle, glass-like material which could easily be pulverized.

Phosphate Salt 3

A phosphate salt was prepared which contained, regarded mathematically, 3 boron atoms, 6 phosphate groups and 6 base equivalents of amine per 2 aluminium atoms. For this purpose, 693 parts of 85% strength o-phosphoric acid and 165 parts of water were first reacted at 95° C. with 156 parts of aluminium hydroxide to give a clear solution. This was then cooled. Separately therefrom, 185.4 parts of o-boric acid were reacted at 80° C. with 366.5 parts of monoethanolamine to give a clear solution.

The two solutions were then combined at 95° C. with intensive mixing. The mixture was stirred for a further 2 hours at 95° C. and a clear solution Was then obtained. The solution was cooled and then had, at room temperature, a viscosity of 4760 m x Pas at a density of 1.496 g/cm$^3$ and a pH of 6.3. It was dried in a circulated-air oven at 90° C.

Phosphate Salt 4

The procedure for the preparation of phosphate salt 1 was repeated, but adding a further 400 parts of 25% strength aqueous ammonia solution to the boric acid/amine salt solution. This gave a viscous solution having a pH of 8.

Phosphate Salt 5

The procedure for the preparation of phosphate salt 3 was repeated, but using, in place of the monoethanolamine, a mixture of 183.3 parts of monoethanolamine with 210 parts of diethanolamine and 159 parts of triethanolamine. The clear solution obtained was dried in a spray drier.

PREPARATION OF HOLLOW BEADS OF THE INVENTION AND PRODUCTS CONTAINING THEM

The production of hollow beads using the phosphate salts 1 to 5 was carried out in the same way. It is therefore illustrated below using the phosphate salt 3 as an example.

EXAMPLE 1

Phosphate salt 3 in dried form was comminuted in a mill and then the fractions having an average diameter of over 2 mm and less than 0.35 mm were removed by sieving. A stainless steel sheet was uniformly sprinkled with the middle fraction in an amount of 100 g/m$^2$, the sheet was then introduced into a furnace preheated to 350° C. and having light air circulation, and after 15 minutes was taken out again. The materials sprinkled onto the sheet had formed brownish hollow beads having diameters in the range from 0.3 to 10 mm. The hollow beads formed were fractionated by sieving, giving the following fractions:

| Fraction | Diameter [mm] | Bulk density [g/l] |
|---|---|---|
| A | above 5 | 11.4 |
| B | 5,0–2,0 | 20.4 |
| C | 2,0–1,2 | 47.1 |
| D | 1,2–0,8 | 84.1 |
| E | 0,8–0,35 | 166.3 |

The hollow beads were not destroyed by water.

The beads were subsequently heated to 1100° C. for 30 minutes in a furnace to which air was admitted. During this procedure they became colourless while maintaining their structure.

EXAMPLE 2

The procedure of Example 1 was repeated, but with the furnace being preheated to 250° C. This gave, over the course of 15 minutes, pale yellow hollow beads whose average bulk density for the fraction D was 109 g/l. The bulk densities of the other fractions were likewise significantly higher than in Example 1. Subsequent heating to temperatures of above 300° C. led to no further expansion of the beads.

EXAMPLE 3

The procedure of Example 1 was repeated, but with the furnace being preheated to 650° C. This gave brownish hollow beads whose bulk density for fraction D was 74 g/l. In an analogous manner, the bulk densities of the other fractions were also significantly below the corresponding values in Example 1.

Examples 1 to 3 show that the hollow beads obtainable have lower wall thicknesses with rising temperature of the heat shock.

Finally, the weight loss and the total volumes of hollow beads obtained in each case from 100 g of dried phosphate salts were determined in each case, giving the following results:

Example 1: total volume 1120 ml, weight loss 27%

Example 2: total volume 720 ml, weight loss 20%

Example 3: total volume 1415 ml, weight loss 31%

These measurements show that higher degrees of expansion are achieved at higher temperatures of the heat shock.

EXAMPLE 4

200 parts of the solution of the phosphate salt 3 obtained prior to drying in the circulated-air oven were mixed with 500 parts of commercial $SO_x$ expandable graphite, the material was then dried in a circulated-air oven at 90° C. and pulverized.

The particle fraction having diameters between 0.5 and 2 mm was heated to 350° C. in a similar manner to Example 1. This gave approximately spherical hollow particles which did not tend to stick together and had expanded graphite particles inside and on the surface. These particles had a bulk density of 14 g/l and good mechanical stability.

EXAMPLE 5

The procedure of Example 4 was repeated, but only mixing in 250 parts of expandable graphite. This gave approximately spherical particles which did not stick together and had a bulk density of 10.5 g/l and good mechanical stability.

A repetition of the example, in which the material provided with expandable graphite and dried was heated to 650° C., gave hollow beads having a bulk density of 9.5 g/l.

EXAMPLE 6

The procedure of Example 3 was repeated, but using a starting material which had been dried at 190° C. instead of at 90° C. This Gave brownish hollow beads in which the fraction D had a bulk density of 65 g/l.

EXAMPLE 7

Phosphate salt 3 was dried at 180° C. and comminuted to an average particle diameter of from 0.1 to 0.3 mm. This powder was, by means of an air stream, metered into an air stream heated to 700° C. The hollow beads formed were separated out of the hot air stream in a cyclone and their bulk density was determined. It was 30 g/l.

Such beads can be used as an insulating bed.

EXAMPLE 8

The phosphate salt fraction also used in Example 7 was metered into the feed air stream of a natural gas blower directed vertically upwards in a steel tube. The hollow beads formed separated out of the stream of the flame gases, these beads having a bulk density of 20 g/l.

EXAMPLE 9

The hollow bead fraction C obtained as described in Example 1 was conveyed through a 10% strength solution of the phosphate salt 1 and then sieved off. The 7 cm thick layer of the beads was dried on the sieve by passing through warm air and then further heat treated at 900° C. This gave a plate of thermal insulation material made up of hollow beads, the plate withstanding temperatures of above 1000° C.

EXAMPLE 10

The granular materials obtained as described in Example 5 were mixed with 100 parts of commercial diphenylmethanediisocyanate and 10 parts of water per 100 parts of granular material, and the granular material thus treated was placed in a box mould. Curing was carried out at 90° C. and gave a light-weight shaped body which can be used as a structural component.

EXAMPLE 11

Into a commercial silicone jointing compound curing according to the oxime system were mixed 50% of the fraction E from Example 1. The curing properties of the paste were not changed, but the weight reduction led to a considerable material saving.

EXAMPLE 12

The procedure of Example 9 was repeated, but using a 10% strength sodium silicate solution in place of the 10% strength solution of the phosphate salt. This gave a stable plate made of bound hollow beads, which plate is suitable as an insulating structural component.

What is claimed is:

1. A process for producing hollow beads by first drying a reaction product of an acid aluminum phosphate with an amine at from 20° to 200° C., then comminuting the dried reaction product and finally subjecting it to a heat shock by contact with a media preheated to a temperature of from 250° to 1200° C., or by heating to a temperature within said range by the direct action of microwaves, alternating fields or radiation, to produce hollow beads.

2. The process of claim 1, wherein said reaction product is a reaction product of an acid aluminum phosphate, a boric acid and an amine.

3. The process of claim 2, in which said reaction product contains at least 1.5 atoms of phosphorus per aluminium atom, at least one base equivalent of alkanolamine per boron atom and at least 0.5 base equivalents of alkanolamine per phosphorus atom.

4. The process of claim 1, wherein said reaction product is a reaction product of an acid aluminum phosphate with an alkanolamine.

5. The process of claim 1, wherein said reaction product is a reaction product of an acid aluminum phosphate with an amine salt.

6. The process of claim 1, wherein said reaction product is prepared in aqueous medium by combining a solution of an acid aluminum phosphate with a solution of an amine, amine salt or amine salt of boric acid at from 20° to 120° C., and is subsequently dried by means of drum or spray drying.

7. The process of claim 6, in which said drying is carried at from 90° to 200° C. and said heat shock is of from 250° to 1000°. drying is carried out at from 90° to 200° C.

8. The process of claim 1, in which said drying is carried out at from 90° to 200° C.

* * * * *

UNITED STATES PATENT AND TRADEMARK OFFICE
CERTIFICATE OF CORRECTION

PATENT NO. : 5,562,870
DATED : October 8, 1996
INVENTOR(S) : Bonin, Wulf von

It is certified that error appears in the above-indentified patent and that said Letters Patent is hereby corrected as shown below:

| | |
|---|---|
| Title Page | Inventor [75]: After Wulf " delete " V " and insert -- von -- |
| Col. 10, lines 29 & 31 | After " carried " insert -- out --, line 31 after " 1000° " delete " drying is carried out at from 90° to 200°C " |

Signed and Sealed this

Fifteenth Day of April, 1997

Attest:

BRUCE LEHMAN

*Attesting Officer*       *Commissioner of Patents and Trademarks*